Feb. 26, 1952  J. BOLSEY  2,587,436
SYNCHRONIZER ARRANGEMENT
Filed March 8, 1949

INVENTOR.
JACQUES BOLSEY
BY

Patented Feb. 26, 1952

2,587,436

UNITED STATES PATENT OFFICE 2,587,436

SYNCHRONIZER ARRANGEMENT

Jacques Bolsey, New York, N. Y.

Application March 8, 1949, Serial No. 80,339

4 Claims. (Cl. 95—11.5)

My present invention relates to photographic cameras, and more particularly to flash lamp synchronizer means forming part of such photographic cameras.

It is an object of my present invention to provide flash lamp synchronizer means mounted within a photographic camera so as to properly synchronize operation of the flash lamp with operation of a release lever forming part of a slidable shutter mechanism.

It is a particular object of my present invention to provide an electrical connection between contact means mounted on a slidable shutter, and a connector member mounted on the camera body so that this connection is simple in construction, and nevertheless, reliable in operation.

With the above objects in view, a preferred embodiment of my present invention consists in a flash lamp synchronizer comprising in combination, electrical contact means carried by the slidable shutter mechanism, electrical connector means mounted on the camera body, and an electrical wire connected at one end to the electrical contact means carried by the slidable shutter mechanism and constructed so as to permanently contact with its other end the electrical connector means mounted on the camera body during sliding of the slidable shutter mechanism relative to the camera body.

In accordance with my present invention, the electrical wire mentioned above is connected at one end to the electrical contact means mounted on the slidable shutter mechanism and at its other end to the connector member mounted on the camera body, and having a length being at least as great as the maximum distance between the contact means and the connector member during sliding of the slidable shutter mechanism relative to the camera body.

In a particularly preferred arrangement according to my present invention, I provide in a photographic camera, a camera body, a lens barrel arranged slidably within the camera body, a slidable shutter mechanism mounted on one end of the lens barrel slidable together with the same, electrical contact means carried by the slidable shutter mechanism, electrical connector means mounted on the camera body rearwardly from the rear end of the lens barrel, an axial groove in the outer surface of the lens barrel extending in axial direction thereof, and an electric wire connected at one end to the electrical contact means carried by the slidable shutter mechanism, passing through said axial groove in the outer surface of the lens barrel, and connected at its other end to the electrical connector means, the electric wire having a length being at least as great as the maximum distance between the contact means and the connector means during sliding of the lens barrel and the slidable shutter mechanism relative to the camera body.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
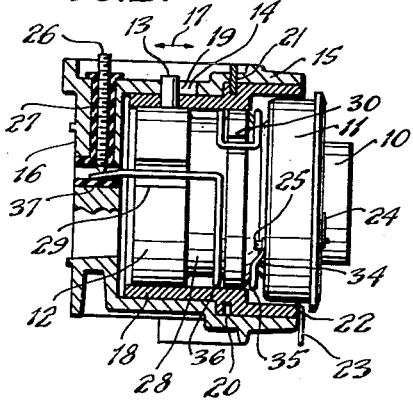
Fig. 1 is an elevational section through a part of a photographic camera equipped with synchronizer means according to my present invention with the shutter mechanism in end position.

In all embodiments described below and shown in the drawings, the lens 10 together with the shutter mechanism 11 is carried by the lens barrel 12, which is provided with a radially extending pin 13. This pin 13 passes through and is guided by the longitudinal slot 14 provided in the cylindrical portion 15 of the camera body 16 surrounding the lens barrel 12. Thus, the lens barrel 12 is prevented from turning, but is able to slide to and fro in direction of the optical axis of the lens 10, as indicated by arrow 17.

Figure 6:
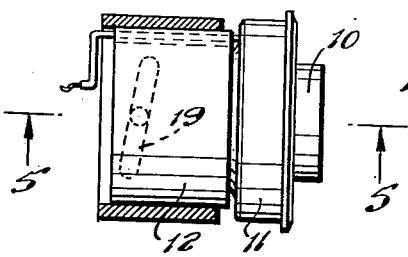
Fig. 6 is a horizontal section through the arrangement shown in Figure 5, along line 6—6 of Figure 5.

Between the inner cylindrical surface of the cylindrical body portion 15, and the lens barrel 12, I arrange a cylindrical guiding sleeve 18 provided with a helical slot 19 as shown in Figure 6 in dotted lines through which passes the pin 13 as clearly shown in the drawings.

The cylindrical guiding sleeve 18 is provided with an annular slot 20 into which projects the guide plate 21 secured to the cylindrical portion 15 of the camera body 16. This guide plate 21 prevents movement of the cylindrical guiding sleeve 18 in axial direction indicated by arrow 17, while permitting its turning about the optical axis of the lens 10.

At the front edge 22 of the cylindrical guiding sleeve 18, I provide a focusing lever 23. By turning of this focusing lever 23, it is possible to turn the guiding sleeve 18. Such turning movement of the guiding sleeve 18 will be transmitted by means of the helical slot 19 and pin 13 to the lens barrel 12, resulting in sliding of the same in axial direction indicated by arrow 17.

On the shutter mechanism 11, I provide the releasing lever 24, which cooperates with switch means not shown in the drawing: These switch means are constructed so as to establish electric connection between the metallic body of the shutter mechanism and the electrically insulated contact screw 25 whenever the releasing lever is turned from operative into shutter releasing position.

In accordance with my present invention, I provide in the camera body 16 a connector screw 26, electrically insulated by sleeve 27 from the camera body.

Figure 2:
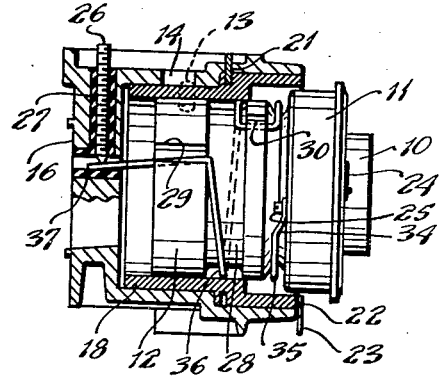
Fig. 2 is an elevational section similar to the one shown in Figure 1, showing however, the lens barrel and shutter mechanism in the other end position.
Figure 3:
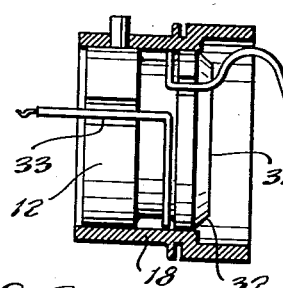
Fig. 3 is a side view, partly in section, of the arrangement shown in Figure 1 before the shutter mechanism and lens unit is screwed into the lens barrel.

Furthermore, I provide in the embodiment shown in Figures 1 to 3, in the outer surface of the lens barrel 12, a transversal annular groove 28, and two axial grooves 29 and 30, arranged as shown. Finally, also in accordance with my present invention, I provide in this embodiment at the front end 31 of the lens barrel an additional annular groove 32.

The insulated electric wire serving for establishing electrical connection between the connector screw 26 and the electrically insulated contact screw 25 is arranged as shown: It is secured at its front end 34 to the contact screw 25, forms a loop 35 in the additional annular groove 32, passes through the axial groove 30, forms another loop 36 in the transversal annular groove 28, passes through the axial groove 29, and firmly held at its rear end by the connector screw 26 between the tip thereof, and the insulating sleeve 37.

It is evident that during sliding of the lens barrel 12 together with the shutter mechanism 11 from its position shown in Figure 1, into its position shown in Figure 2, the ends of the wire 33 stay firmly connected to the contact screw 25 on the one hand, and the connector screw 26 on the other hand. The only change will be that the wire loop 36 in the annular groove 28 will give slightly, acquiring the shape shown in Figure 2. In this manner it is possible to obtain reliable connection between the contact screw 25 mounted on the slidable shutter, and the connector screw 26 mounted on the stationary camera body, irrespective of the position of sliding of the shutter mechanism.

In order to facilitate mounting of the shutter mechanism 11 and lens 10 to the lens barrel 12 by means of the screw threaded projection 38, I provide, as set forth above, the additional annular groove 32 and the wire loop 35 arranged thereon which permits easy mounting of the shutter-lens unit as clearly shown in Figure 3.

Figure 4:
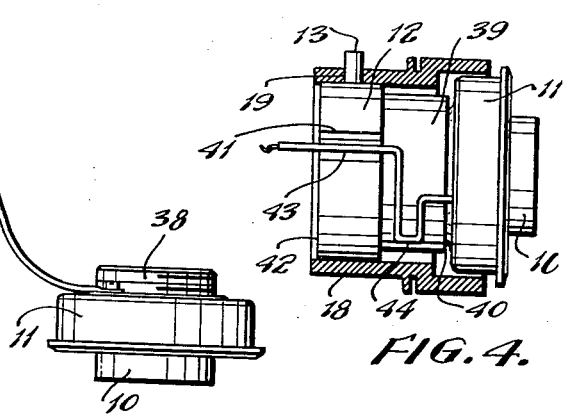
Fig. 4 is an elevational section through a part of a photographic camera equipped with synchronizer means similar to the ones shown in Figures 1 to 3.

The embodiment shown in Figure 4 is very similar to the one shown in Figures 1 to 3, and described above. The only difference is that the annular groove 39 is made wider, reaching to the front face 40 of the lens barrel 12, and is connected by the axial groove 41 with the rear face 42 of the barrel. The connecting wire 43 passes through these grooves as shown, forming a resilient loop 44 in the wide annular groove 39.

Figure 5:
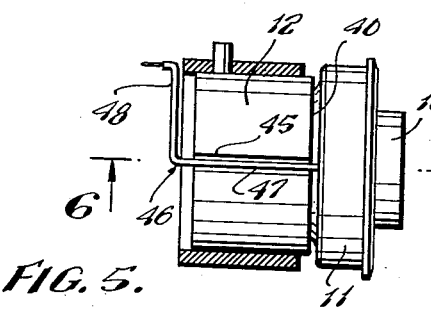
Fig. 5 is an elevational section along the line 5—5 of Figure 6 through a part of a photographic camera also equipped with synchronizer means similar to the one shown in Figures 1 and 2.

In the arrangement shown in Figures 5 and 6, I have omitted the annular grooves, and provide only one single straight axial groove 45 passing from the front face 40 to the rear face 42 of the lens barrel 12. In this arrangement the wire 46 is composed of a straight wire portion 47 arranged in the straight axial groove 45, and an arcuate wire portion 48 arranged rearwardly from the rear face 42 of the lens barrel, in a plane parallel thereto. It is evident that this arcuate wire portion 48 is adapted to give, and to adjust itself to the necessary extent during sliding of the lens barrel in axial direction.

Figure 7:
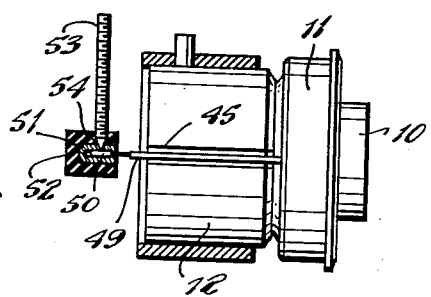
Fig. 7 is an elevational section through a part of a photographic camera equipped with synchronizer means including a slidable contact.

In the arrangement shown in Figure 7, the shape of the groove 45 is identical to the one shown in Figures 5 and 6. The only difference is that the wire 49 is not firmly connected to the connector screw 26, but is provided with a piston-shaped contact portion 50, sliding within the sleeve-shaped contact member 51, arranged within the insulating sleeve 52. The connector screw 53 passes through a hole 54 in the insulating sleeve 52 contacting the sleeve-shaped contact member 51. In this arrangement, the wire 49 does not have to give during sliding of the lens barrel, but permanent electric contact between its rear end and the electrical connector screw 53 is assured by the sliding contact means described above.

It will be understood that each of the elements described above, or two or more together, may also find a useful application in other types of synchronizer arrangements differing from the types described above.

While I have illustrated and described the invention as embodied in photographic cameras provided with a slidable lens barrel, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new, and desire to secure by Letters Patent is:

1. In a photographic camera a camera body forming a tubular guiding chamber having a cylindrical surface; a slidable lens barrel having an outer cylindrical surface, a front end and a rear end and arranged slidably within said tubular guiding chamber of said camera body with its outer cylindrical surface in contact with and supported by the cylindrical surface of said tubular guiding chamber; a shutter mechanism mounted on said front end of said slidable lens barrel slidably together with the same; electrical contact means carried by said shutter mechanism slidably together with the same; stationary electrical connector means mounted on said camera body rearwardly from the rear end of said slidable lens barrel; a groove in said outer cylindrical surface of said slidable lens barrel extending from the front end to the rear end thereof and including at least one transverse groove portion extending in a transversal direction of said cylindrical surface of said lens barrel; an insulated wire passing through said groove and including a wire portion located in said transverse groove portion, also extending in a substantially transversal direction of said cylindrical surface of said lens barrel and having a diameter which is smaller than the width of said transverse groove portion, said insulated wire having a front end portion and a rear end portion projecting beyond the front and rear end, respectively, of said slidable lens barrel; first connecting means connecting said insulated electric wire at its front end to said electrical contact means carried by said slidable shutter mechanism slidably together with the same; and second connecting means connecting said insulated electric wire at its rear end to said stationary electrical connector means mounted on said camera body.

2. In a photographic camera a camera body forming a tubular guiding chamber having a cylindrical surface; a slidable lens barrel having an outer cylindrical surface, a front end and a rear end and arranged slidably within said tubular guiding chamber of said camera body with its outer cylindrical surface in contact with and supported by the cylindrical surface of said tubular guiding chamber; a shutter mechanism mounted on said front end of said slidable lens barrel slidable together with the same; electrical contact means carried by said shutter mechanism slidably together with the same; stationary electrical connector means mounted on said camera body rearwardly from the rear end of said slidable lens barrel; a transversal annular groove in said outer cylindrical surface of said slidable lens barrel; at least one additional groove in said outer cylindrical surface of said slidable lens barrel reaching from one end of said slidable lens barrel to said transversal annular groove; an insulated electric wire arranged within said grooves passing through the same and including a wire portion located in said transversal groove, extending in a substantially transversal direction of said cylindrical surface of said lens barrel and having a diameter which is smaller than the width of said transversal groove, said insulated wire having a front end portion connected to said electrical contact means carried by said shutter mechanism slidably together with the same and a rear end portion projecting beyond said rear end of said slidable lens barrel; and means electrically connecting said projecting rear end portion of said insulated electric wire to said stationary electrical connector means mounted on said camera body.

3. In a photographic camera a camera body forming a tubular guiding chamber having a cylindrical surface; a slidable lens barrel having an outer cylindrical surface, a front end and a rear end and arranged slidably within said tubular guiding chamber of said camera body with its outer cylindrical surface in contact with and supported by the cylindrical surface of said tubular guiding chamber; a shutter mechanism mounted on said front end of said lens barrel slidably together with the same; electrical contact means carried by said shutter mechanism slidably together with the same; stationary electrical connector means mounted on said camera body rearwardly from the rear end of said slidable lens barrel; a transversal annular groove in said outer cylindrical surface of said slidable lens barrel spaced from both ends thereof; two additional grooves in said outer cylindrical surface of said slidable lens barrel, one of said additional grooves reaching from said front end of said slidable lens barrel to said transversal annular groove, and the other reaching from said transversal annular groove to said rear end of said slidable lens barrel; an insulated electric wire arranged within said grooves passing through the same and including a wire portion located in said transversal groove, extending in a substantially transversal direction of said cylindrical surface of said lens barrel and having a diameter which is smaller than the width of said transversal groove, said insulated wire having a front end portion connected to said electrical contact means carried by said shutter mechanism slidably together with the same and a rear end portion projecting beyond said rear end of said slidable lens barrel; and means electrically connecting said projecting rear end portion of said insulated electrical wire to said stationary electrical connector means mounted on said camera body.

4. In a photographic camera a camera body forming a tubular guiding chamber having a cylindrical surface; a slidable lens barrel having an outer cylindrical surface, a front end and a rear end and arranged slidably within said tubular guiding chamber of said camera body with its outer cylindrical surface in contact with and supported by the cylindrical surface of said tubular guiding chamber; a shutter mechanism mounted on said front end of said slidable lens barrel slidably together with the same; electrical contact means carried by said shutter mechanism slidably together with the same; stationary electrical connector means mounted on said camera body rearwardly from the rear end of said slidable lens barrel; a transversal annular groove in said outer cylindrical surface of said slidable lens barrel spaced from both ends thereof; two additional grooves in said outer cylindrical surface of said slidable lens barrel, one of said additional grooves reaching from said front end of said slidable lens barrel to said transversal annular groove, and the other reaching from said transversal annular groove to said rear end of said slidable lens barrel; an insulated electric wire arranged within said grooves passing through the same and including a wire portion located in said transversal groove, extending in a substantially transversal direction of said cylindrical surface of said lens barrel and having a diameter which is smaller than the width of said transversal groove, said insulated wire having a loop-shaped front end portion projecting beyond said front end of said slidable lens barrel and a projecting rear end portion; means electrically connecting the free end of said loop-shaped front end portion of said insulated electric wire to said electrical contact means carried by said shutter mechanism slidably together with the same; and means electrically connecting said projecting rear end portion of said insulated electrical wire to said stationary electrical connector means mounted on said camera body.

JACQUES BOLSEY.

REFERENCES CITED

The following references are of record in the file of this patent:

UNITED STATES PATENTS

| Number | Name | Date |
|---|---|---|
| 2,222,292 | Gorlich | Nov. 19, 1940 |
| 2,278,173 | Goering | Mar. 31, 1942 |

FOREIGN PATENTS

| Number | Country | Date |
|---|---|---|
| 543,054 | Great Britain | Feb. 9, 1942 |
| 877,925 | France | Sept. 21, 1942 |